United States Patent

Osborn et al.

[15] 3,660,830

[45] May 2, 1972

[54] MULTI-ELEMENT SHAFT ENCODER INCORPORATING A GENEVA DRIVE

[72] Inventors: Fredrick W. Osborn, Purdy's Station; Geoffrey S. Hedrick, Bedford; William A. Prasse, Bedford, all of N.Y.

[73] Assignee: Lear Siegler, Inc., Armonk, N.Y.

[22] Filed: Aug. 18, 1969

[21] Appl. No.: 851,020

[52] U.S. Cl. ....................340/204, 250/236

[51] Int. Cl. ....................G08c 9/06

[58] Field of Search ....................235/140; 340/204, 347, 357

[56] References Cited

UNITED STATES PATENTS

| | | | |
|---|---|---|---|
| 778,447 | 12/1904 | Cleveland | 235/140 |
| 1,607,294 | 11/1926 | Murphy | 235/140 |
| 2,796,566 | 6/1957 | Maynard et al. | 340/204 |
| 2,977,583 | 3/1961 | Timothy et al. | 340/204 |
| 3,262,108 | 7/1966 | Schuman | 340/347 PR |
| 3,268,885 | 8/1966 | Coyle et al. | 340/347 PR |
| 3,484,780 | 12/1969 | Akira-Kamoi et al | 340/347 PR |

*Primary Examiner*—Thomas B. Habecker
*Attorney*—Wilfred O. Schmidt and Hubbell, Cohen & Stiefel

[57] ABSTRACT

Digital encoder for an input variable represented by rotation of a shaft, as for encoding the altitude reading of an altimeter, comprising a pair of encoder discs having arcuate tracks or bit paths bearing rotational position indicia, and means for sensing the indicia, one of the discs being driven at a relatively low average speed by a geneva drive interposed between the input shaft and the low-speed disc. The low-speed disc carries higher order or coarse data. Using transparent encoder discs having opaque tracks thereon in the form of a conventional gray code, duplication of tracks having the same form but differing in phase is eliminated by utilizing two pickups separated at appropriate angular intervals along a single track. Where one cycle is complementary to another, two pickups may be used with a single track, one of the signals being fed through an inverter to obtain the proper resultant signal.

5 Claims, 3 Drawing Figures

INVENTORS
FREDRICK W. OSBORN
GEOFFREY S. HEDRICK
WILLIAM PRASSE
BY
ATTORNEYS.

INVENTORS
FREDRICK W. OSBORN
GEOFFREY S. HEDRICK
WILLIAM PRASSE

BY Hubbell Cohen & Stiefel
ATTORNEYS.

MULTI-ELEMENT SHAFT ENCODER INCORPORATING A GENEVA DRIVE

BACKGROUND OF THE INVENTION

1. Field of the Invention

The improved devices of the present invention encode rotational input into digital output signals.

2. Description of the Prior Art

Many instruments provide output in the form of rotation of a shaft, e.g. instruments having a pointer to be read cooperatively with a dial, such as altimeters, clocks, ammeters, etc. It is often desirable to translate, or encode, such analog information in the form of mechanical rotation into electrical signals in digital form. Conventionally, a disc or drum encoder carrying a plurality of bit tracks may be employed. Indicia which may be sensed by various pickup devices are carried on each bit track, the configuration of indicia for all of the tracks at any particular rotational position being unique with respect to other rotational positions. In general, a code is employed in which the configuration changes in a predetermined pattern at small rotational intervals.

The numerical precision, i.e. the number of significant figures, to be obtained from the encoder determines the number of tracks on the encoder element and the angular separation between transitions. For example, if the information must be known to a precision of 1 in 500, then the precision with which markings are placed on the encoder element and are sensed by the pickup devices, must be much smaller than 1° of rotation. The physical size of the pickup to be used and accuracy requirements of the encoder often makes it necessary to use an encoder disc of relatively large circumference, and the fact that many tracks are employed makes it desirable to increase the size of the circle even more to permit separation between the tracks. Instruments having such increased size are unacceptable, especially in aerospace applications where space and weight are at a premium.

Conventionally, to reduce the space required for the encoder without reducing the precision with which the smallest increments are determined, a pair of encoder discs is employed, the discs operating at different speeds. One disc rotates continuously at a rate of one revolution over the entire interval which is being measured, for example 5000 units, and another disc is rotated continuously at a rate higher than that of the primary disc, e.g. 50 times as fast, or once every 100 units. The bit tracks on the high-speed disk carry patterns of indicia which repeat several times over the range of variables being measured, i.e. digits from 0 to 99, so that the high speed disc is rotated several times, here 50, during a single rotation of the low speed disk. Transitions on the high speed disc, i.e. every hundred units, thus take place in a short period of time, thereby reducing the period of ambiguity to a brief interval or increment.

The reduced periods of ambiguity from the high speed disc are not, however, matched by those from the low speed disc. As the low speed disc rotates more slowly, there results a greater period of ambiguity resulting from indicia transition during which a reading of the low-speed disc may be improperly sensed. For example, assuming some sort of decimal code, if the high-speed disc determines the significant figures from 0 to 99, and the low speed disk gives the coarse reading of hundreds, the device may generate proper signals from 0 to 99, but then, because the transition in the primary disc from zero hundred to one hundred is of prolonged duration, an improper sensing during a substantial interval could result.

In the aircraft altimeter, such erroneous or ambiguous readings may be particularly disastrous, inasmuch as the encoder may be used to produce a signal which is fed into a collision avoidance computer to determine corrective maneuvers for the aircraft. For this reason monostropic code is conventionally used for aircraft altitude telemetry, namely the Altitude Telemetry Code, which serves to minimize the adverse effects from a lack of perfect synchronism between signals obtained from various tracks. However, even with a monostropic code, such ambiguity, resulting from the difficulty of detecting indicia transitions of the low-speed disc, remains a significant source of error, which error should be eliminated entirely for best results.

SUMMARY OF THE INVENTION

The present invention is an improvement in multielement encoders, and in a preferred embodiment, in two-disc encoders as described hereinabove. It has now been found that the low-speed disc should not be driven by continuous gearing from the input because the slow speed of the disc gives rise to a relatively lengthy ambiguity in the detection of the indicia indicating its position at indicia transitions. Instead according to the present invention, the encoder incorporates means for driving the slow disc incrementally. The disc is caused to rotate at an overall or average rate which is equivalent to that employed for conventional continuously rotating low speed discs but is driven in a series of short, quick steps, separated by relatively long stationary pauses. During these pauses, there is no change in the signal to be picked up from the primary disc, and so it is held stationary until the next step, when the output is to change. More specifically, the low-speed disc may be driven incrementally by a geneva drive, interposed between the rotatable input shaft and the low-speed, primary disc. The period between steps of the of the geneva drive preferably corresponds to the period between the closest changes in state on the low-speed disc, so that one change in signal from the low-speed disc occurs during each movement, or step, of the low-speed disc. However, the change or transition occurs at high speed whereby to reduce the period of ambiguity.

Various configurations of the encoding tracks may be used by producing various types of digital signals. For example, a binary system may be used, in which each bit track represents a successive power of base two. However, it is conventional to utilize a unit distance, or monostropic, reflected code for telemetry of altitude signals, this being a well-known form of gray code. In a preferred embodiment of the present invention, the information required by two pickups may be supplied by proper spacing of the pickups along a particular single track, in one instance using an inverter to obtain the second signal.

DESCRIPTION OF THE PREFERRED EMBODIMENT

Figure 1:
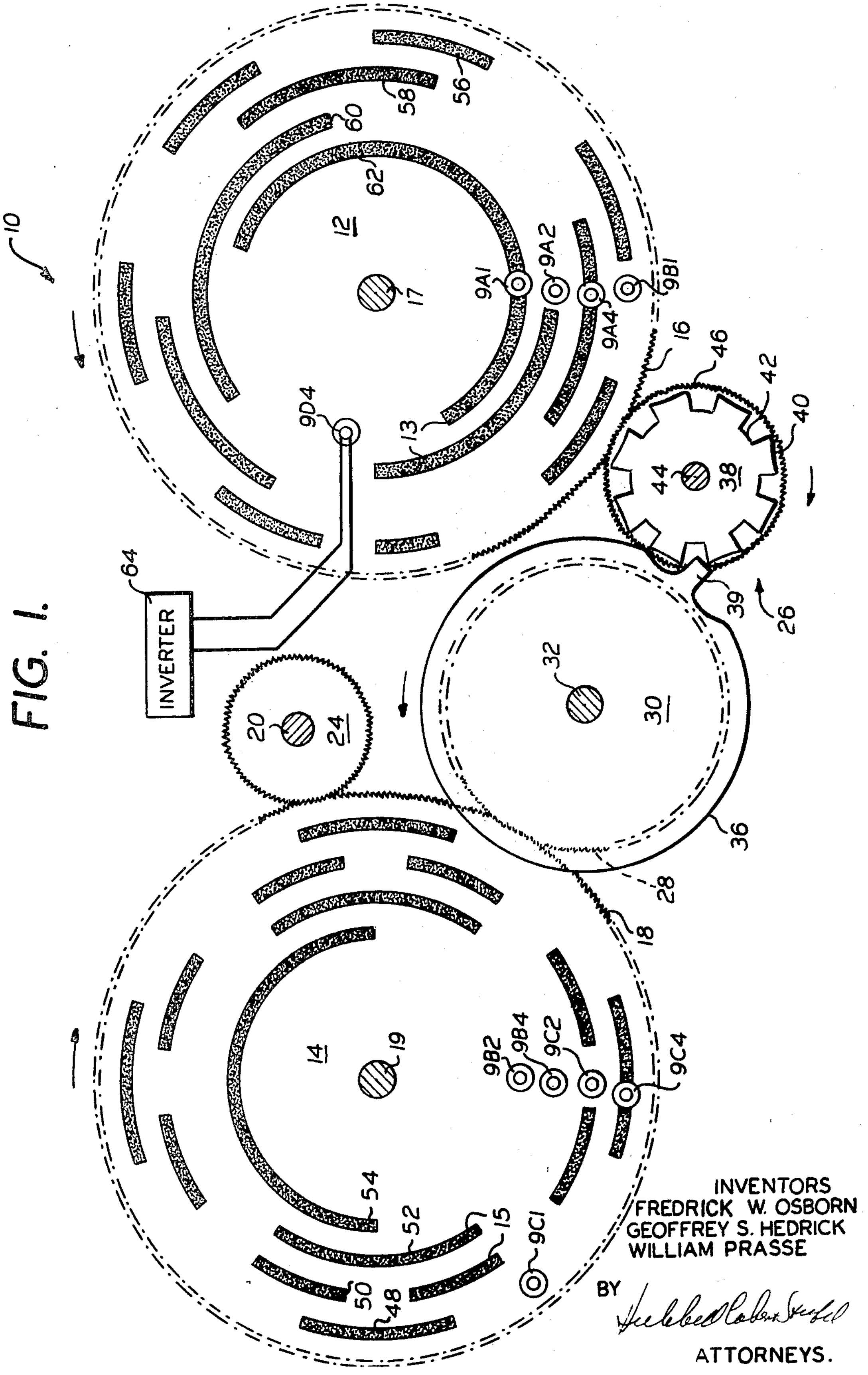
FIG. 1 is a top plan view of an embodiment of the present invention.
Figure 2:
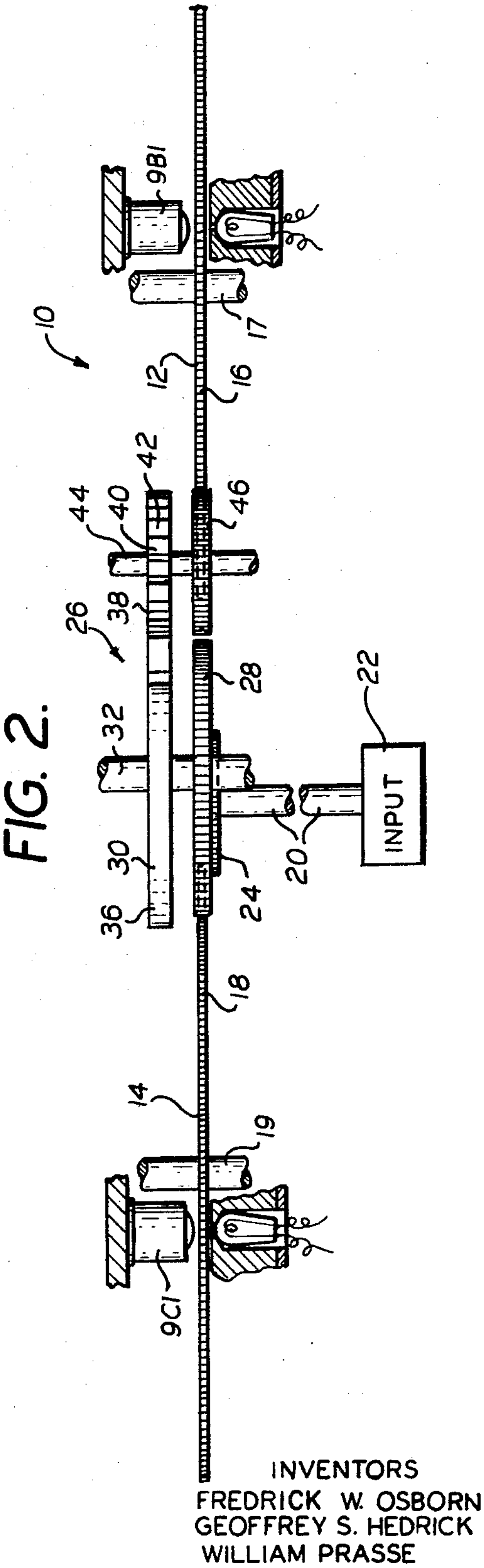
FIG. 2 is a front elevation of the embodiment shown in FIG. 1.

As shown in FIGS. 1 and 2, an encoder 10 embodying the present invention comprises a pair of rotatable encoder elements, in the illustrated embodiment a low-speed disc 12 and a high-speed disc 14. Each of the discs 12 and 14 carries indicia, generally designated as 13 and 15, respectively, which may be sensed by suitable detectors 9C1, 9C2, 9C4, 9B4 and 9B2 (utilized with high-speed disc 14), and 9B1, 9A1, 9A2, 9A4 and 9B4 (utilized with low-speed disc 12). The indicia 13 and 15 are arranged in a code pattern described in detail hereinbelow. The indicia are preferably opaque markings on transparent discs, the detectors used therewith being photoresponsive means such as phototransistors in register with light sources disposed on the opposite sides of the discs. Alternatively, conductive indicia on insulating discs may be used with brushes or wipers as detectors, reflective indicia could be employed, magnetic indicia may be employed, etc.

The discs 12 and 14 are fixed, respectively, to gears 16 and 18. The gears 16 and 18 may be toothed peripheral extensions of the encoder discs, as shown; alternatively the gears 16 and 18 may be fixed to the encoder disc shafts 17 and 19, respectively. In accordance with the present invention, the discs 12 and 14 are rotated by gears 46 and 24 respectively in mesh with the toothed peripheries 16 and 18 of encoder disc gears 12 and 14, respectively.

A rotatable input shaft 20, driven through well known suitable means such as gears, linkages or combinations thereof by an input means 22, for example an altitude capsule, is secured to an input gear 24. The input gear 24 is in mesh with the high speed encoder disc gear 18, so that the high-speeded secondary disc 14 is driven directly by continuous gearing from the input means 22. The low-speed disc 12, however, is not driven by continuous gearing from the input means 22; rather it is caused to rotate intermittently by a geneva drive 26 interposed between the input means 22 and the low-speed disc 12.

Specifically, as shown, the geneva drive 26 is interposed between the high-speed disc 14 and low-speed disc 12. The input to the geneva drive 26 is a gear 28 in mesh with the high-speed disc gear 18. Thus, the geneva input gear 28 is also driven by continuous gearing from the input means 22. The input gear 24 and the geneva input gear 28 do not, however, mesh with each other; instead each meshes, respectively, with the high-speed disc gear 18. One skilled in the art will readily appreciate, however, that alternatively the apparatus could be constructed so that the input gear 24 would not engage the high-speed disc gear 18 but instead would engage directly the geneva input gear 28. In such an alternative embodiment, both the high-speed disc gear 18 and the geneva input gear 28 would similarly be continuously driven by gearing from the input means 22. Other continuous gearing arrangements will readily suggest themselves to persons skilled in the art.

The continuously driven geneva input gear 28 is fixed to a geneva driving element 30 by a shaft 32. The geneva driving element 30 has a single tooth 34 and a smooth circumferential locking portion 36. A geneva pinion 38 meshes with the geneva driving element and is rotated a single step, here for example one-eighth of a turn, each time the driving element 30 is rotated a full revolution, the driving tooth 34 causing the geneva pinion 38 to rotate. As shown, the geneva pinion 38 has a plurality of concave locking surfaces 40 having substantially the same radius of curvature as the locking portion 36 of the driving element. 30. As the driving element rotates through most of a revolution, the locking surfaces 36 and 40 are in engagement, so that as the driving element 30 rotates, its smooth locking surface 36 slides past the locking surface 40 of the geneva pinion 38, while remaining in close engagement therewith to prevent the pinion 38 from rotating. As the driving tooth 34 approaches the pinion 38, the tooth 34 comes into engagement with a notch 42 of the geneva pinion and causes the pinion 38 to rotate through one step, here one-eighth of a turn.

As the geneva pinion 38 completes its rotation of one step and the tooth 34 disengages therefrom, the next locking surface 40 thereof is brought into confronting relation with the locking portion 36 of the driving element 30, whereupon the pinion 38 is held stationary, as previously described, until the driving element 30 has rotated through almost one revolution and the tooth 34 again confronts a notch 42 in the pinion 38. Thus, the pinion 38 is driven intermittently in short, quick steps separated by relatively long periods of stationary rest. The intermittent motion of the pinion 38 is transmitted to a geneva output gear 46 by a shaft 44 to which both the gear 46 and the geneva pinion 38 are affixed. The geneva output gear 46 is in mesh with the primary disc gear 16, thereby transmitting the intermittent motion of the geneva pinion 38 to the primary disc 12. Thus, while disc 12 is actually turning, it turns very rapidly as compared with a similar disc having a steady rotational speed equal to the average rotational speed of intermittently primary disc 12. This rapid movement, as will become apparent hereinafter, greatly reduces any periods of ambiguity in the operation of encoder 10.

One skilled in the art will appreciate that various alternative forms of geneva drive may be employed to obtain the same result, for example a geneva drive having separate driving tooth and locking elements for the driving portion and separate notched and locking elements of the pinion portion.

According to the present invention, the intermittent gearing is so selected with respect to the coding of the bit tracks that the disc 12 is stationary during the periods when the signals from the primary disc pickups do not undergo transitions. Instead the primary disc 12 is caused to move only when transitions in the signal occur, i.e. during the portion of the cycle when the geneva pinion 38 is caused to rotate. Because each step is relatively rapid, the period of transition from one state of information (i.e. transparent or opaque) on disc 12 to another is greatly reduced to thereby reduce ambiguity.

For example, a monostropic reflected code of the gray code type is conventionally used for telemetry of aircraft altitude determinations.

Three bits, or unmodulated signal channels, conventionally designated as $C_1$, $C_2$ and $C_4$ are encoded to indicate by their combined on-off transitions altitude increments of 100 feet; six bits, designated $A_1$, $A_2$, $A_4$, $B_1$, $B_2$, $B_4$ and $D_4$ are encoded to indicate by their combined on-off transitions increments of 500 feet. The range of such a 10 bit code is approximately 63,000 feet although in the presently preferred and illustrated embodiment, the encoder operates over an altitude range of only 52,000 feet, from −1250 feet to +50,750 feet. Obviously different codes or numbers of bits could be employed in connection with the present invention. Referring once again to FIG. 1, it is to be noted that in a preferred embodiment of the present invention, the high-speed disc 14 is transparent and carries the arcuate tracks 48,50,52 and 54, embodying the codes for the $C_1$, $C_2$, $C_4$, $B_2$ and $B_4$ bits. The arcuate tracks 48, 50, 52 and 54 each comprise the corresponding opaque indicia 15 whereby to leave transparent spaces therebetween at the same radial distances to thereby define the entire bits. The low speed disc 12 is also transparent and carries opaque indicia 13 to form the tracks 56, 58, 60 and 62, which carry the $B_1$, $A_1$, $A_2$, $A_4$ and $D_4$ bits. The $C_1$ and $C_4$ bits have identical periodicity of 1000 feet with each of the bits $C_1$ and $C_4$ having a 400 foot on-time and 600 foot off-time. This can be registered on disc 14 by track 48 comprising an arcuate row of spaced apart indicia 15 of length equivalent to 400 feet of altitude, with the transparent spacing being equivalent to 600 feet of altitude. The only difference between the two codes $C_1$ and $C_4$ is that they are out of phase by an interval of 500 feet so that the $C_1$ signal is on while the $C_4$ signal is off. Thus and in accordance with one feature of the present invention, one arcuate track 48 can be used to generate signals for both the $C_1$ and $C_4$ bits merely by utilizing two separate pickups $9C_1$ and $9C_4$ which are spaced apart by an angular distance which is equivalent to 500 + 1000N feet of altitude, where N is an integer. Such a spacing will cause the two pickups to generate identical signals that are out of phase by the equivalent of 500 feet of altitude, precisely the relationship between the $C_1$ and $C_4$ bits.

Preferably, to maximize accuracy, the high-speed disc 14 is caused to rotate once per revolution in an altitude increment equal to the periodicity of the bit having the greatest periodicity of all bits on disc 14. The $B_2$ code has the greatest periodicity of all bits on disc 14, namely 4000 feet. Thus, the disc 14 is preferably rotated at a period of one revolution for each altitude change of 4000 feet. Accordingly, if the input shaft 20 is rotated, as by an altitude capsule and associated means (the input 22) at a rate of once for every thousand feet of altitude change, one would desirably employ a gear ratio of 4:1 between the input gear 24 and the high-speed disc gear 18. In a preferred embodiment, for example, the input gear 24 may have 55 teeth, and the disc gear 18 may have 220 teeth.

As already noted, the embodiment shown in FIGS. 1 and 2 may appropriately be utilized to generate digital signals indicating altitude from −1250 feet to 50,750 feet, a total range of 52,000 feet. Other intervals could, of course, be chosen, with either the altitude telemetry code or others. With the altitude telemetry code, it is to be noted that the transitions occur in the code pattern for the $B_1$, $A_4$, $A_2$, $A_1$ and $D_4$ bits at 2000-foot intervals. For example, the $B_1$ signal goes on (i.e. the opaque marking 13 of track 56 passes under and is sensed by the phototransistor detector $9B_1$) at 750 feet, and the $A_4$ signal goes on at 2750 feet; thereafter, the $B_1$ signal goes off at 4750 feet, and the $A_2$ signal goes on at 6750 feet, etc. In accordance with the present invention, the purpose of the geneva drive 26 is to cause the low-speed disc 12 to rotate, or "step," rapidly each time the altitude recorded by the altimeter is at an altitude at which one of the signals controlled by the disc 12 undergoes such a transition. This result is accomplished as follows.

In the illustrated embodiment, as the high-speed disc 14 rotates once, corresponding to an altitude change of 4000 feet, the geneva driving element 30 is caused to rotate twice, or once every 2000 feet. The arrangement by which the high-speed disc 14 rotates once per 4000 feet and the low-speed disc 12 rotates once per 52,000 feet is highly desirable in that it enables the number of bits on each disc to be equal whereby to have each of the discs the same diameter with the desirable disposition of the bits near the outer periphery of each disc. Thus the scale factors on the two discs are about equal and the accuracy of the information imparted by the two discs is about the same. If, for example, the high-speed disc gear 18 has 220 teeth, the geneva input gear 28 in mesh therewith may have 110 teeth, so that the shaft 32 is caused to rotate twice as rapidly as the high-speed disc 14. The geneva drive element 30 is rotated by the shaft 32, and thus the single geneva drive tooth 34 is brought into engagement with the geneva pinion 38 once during every 2000-feet change, causing the geneva pinion 38 to move one step, i.e., one-eighth of a revolution, for each such 2000 foot altitude increment. Thus, the geneva pinion 38 will make a complete revolution once for every eight revolutions of the drive element 30, that is, once every 16,000 feet, and thus will rotate 3 ¼ times over the entire 52,000-foot range of the primary disc 12. Hence, to rotate disc 12 once per 52,000 feet altitude change, a gear ratio of 1:3.25 must be employed between geneva output gear 46 and low-speed disc gear 16. In a presently preferred embodiment geneva output gear 46 has 68 teeth, and the low-speed disc gear 16 has 221 teeth.

Considering each step of the geneva drive 26, the driving tooth 34 may remain in engagement with the geneva pinion 38, for example, for one-twelfth of the revolution of the driving element 30. Thus, the geneva pinion 38 and the low-speed disc 12 are in motion during one-twelfth of the revolution of the driving element 30 and remain stationary during the other eleven-twelfths. Thus, even though the low-speed disc 12 rotates at an overall or average rate of 360° for a 52,000-foot change in altitude, and thus an average rate of 13.84° per 2000 foot interval, it actually makes the entire 13.84° movement in one-twelfth of the 2000 foot interval (167 feet) and remains stationary during the period when the altimeter indicates the other 1833 feet of each 2000-foot interval. Thus, when actually moving, low-speed disc 12 moves at a rate 12 times as fast as its average rate. During the stationary period of 1833 feet, the detectors $9B_1$, $9A_1$, $9A_2$, $9A_4$, and $9D_4$ are in register with unambiguous and relatively stationary markings. Thus the intervals of ambiguity arising from movement of disc 12 are extremely brief.

As shown in FIG. 1, the encoder 10 is in a position indicating 38,700 feet. In the illustrated condition of an altitude of 38,700 feet, the fast moving disc 14 is oriented with respect to the detectors 9 associated therewith so that the detector $9C_1$ detects the absence of an opaque marking 13 on the information track 48, detector $9C_4$ detects the presence of a marking, it being angularly displaced along the track 48 with respect to the detector $9C_1$, detector $9C_2$ detects the absence of the marking in track 50, detector $9B_4$ detects the absence of the marking in track 52, and detector $9B_2$ detects the absence of a marking on track 54. Likewise, detector $9B_1$ detects the absence of a marking on track 56, detector $9A_4$ detects the presence of an opaque marking on track 58, detector $9A_2$ detects the absence of an opaque marking on track 60, and detector $9A_1$ detects the presence of an opaque marking on track 62. Detector $9D_4$ detects the absence of a marking on track 62, the detector $9D_4$ being angularly displaced along track 62 with respect to detector $9A_1$, but the detection of the absence of a marking is inverted by an inverter 64 whereby the output is as if a marking 13 were present under the detector $9D_4$. The purpose of the angular displacement of the detector $9D_4$ and its connection to the inverter 64 will be described in greater detail hereinafter. Suffice it to say, with the detectors arranged with respect to their associated bits as just described, the combined outputs of all of the detectors (including detector $9D_4$ and its associated inverter 64) yield information indicating the altitude of 38,700 feet as may be determined by comparing the condition of the encoder of FIG. 1 with the 38,700 foot line on the chart of FIG. 3. Assuming altitude increases, the input gear 24 rotates counterclockwise, causing the secondary disc 14 to rotate clockwise and the driving element 30 to rotate counterclockwise. As the driving element rotates counterclockwise, the driving tooth 34 engages the geneva pinion 38 as the altitude reading reaches 38,710 feet, and causes the geneva pinion 38 to rotate, thereby rotating the disc 12. As the altitude increases slightly, namely to 38,750 feet, the $A_2$ bit goes from off to on by virtue of the encoder disc 12 rotating counterclockwise to bring the opaque marking 13 of the track 50 between the light source and phototransistor of the detector $9A_2$. It is to be noted that the transition of the $A_2$ bit occurs when the disc 12 has rotated about 6.92° from its illustrated position, the rotation occurring during an altitude change of about 83 feet. An additional 83 foot increase of altitude, to 38,833 feet, will complete this step of the primary disc 12, causing the primary disc 12 to rotate an additional 6.92° past the transition point. The geneva drive 26 would then be disengaged upon further increase in altitude, and the primary disc 12 would remain in its new position as the altitude reading increases an additional 1833 feet. An altitude increase greater than 1833 feet past the step would, of course, initiate a new step because the driving tooth 34 would again engage the geneva pinion 38. It is to be noted that during this entire altitude increase, the high-speed disc 14 will rotate continuously, each of the detectors $9C_1$, $9C_2$, $9C_4$, $9B_2$ and $9B_4$ registering the change in altitude reading. Having described in detail the operation of the apparatus as the altitude increases from 38,700 feet, the operation of the apparatus as altitude decreases from 38,700 feet will be apparent to anyone skilled in the art. Accordingly, description of the operation during altitude decrease is deemed unnecessary and is omitted.

Figure 3:
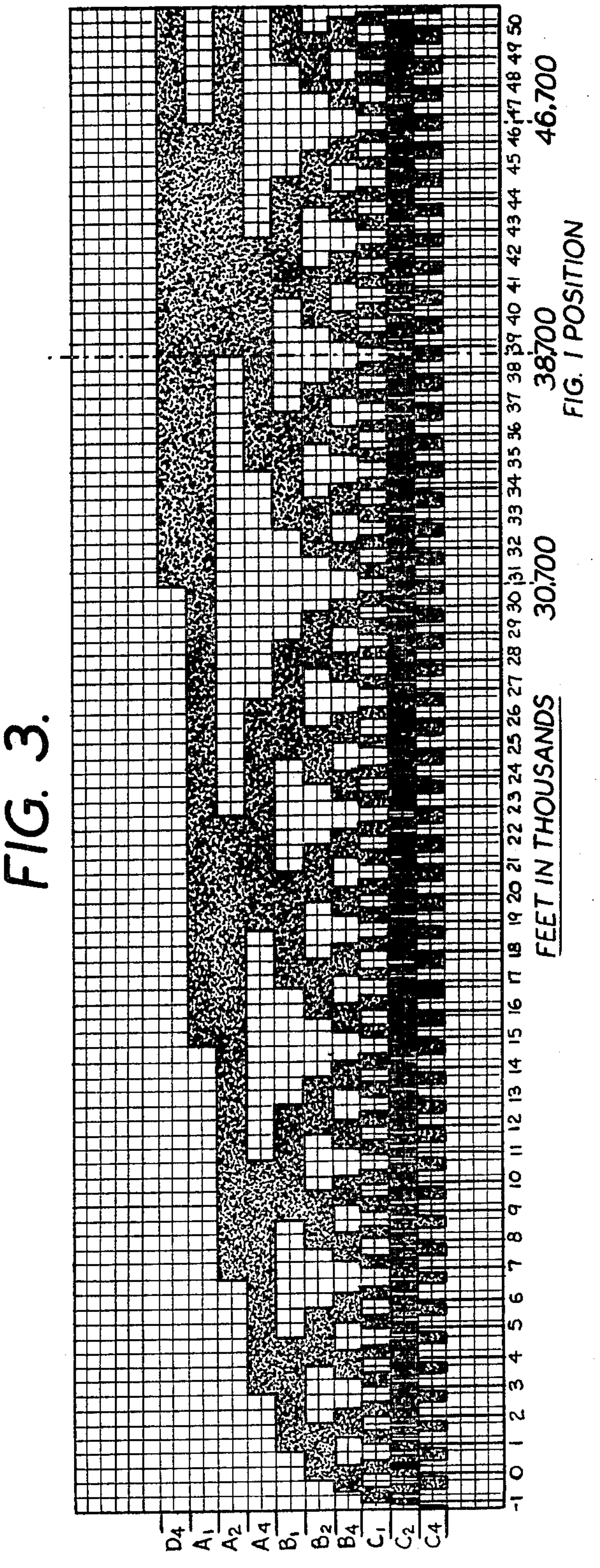
FIG. 3 is a diagram of the conventional altitude code as employed in a preferred embodiment of the present invention.

In accordance with another feature of the present invention, the sizes of the two encoder discs 12 and 14 have been reduced by omitting one track from each of them without losing the information to be imparted by those tracks. This desirable result stems from the form of code employed herein and would be applicable to other similar codes, although such other similar codes are not identical in form to the code of FIG. 3. Specifically, it has been possible to eliminate one track from encoding disc 14 by virtue of the fact that the $C_1$ and $C_4$ bits are identical in form save for a difference in phase. A review of FIG. 3 will indicate that $C_4$ code is 500 feet in advance of the $C_1$ code. Since disc 14 rotates a complete revolution in 4,000 feet, 500 feet represents an eighth of a revolution, or 45°. Accordingly, a single information track 48 having the characteristics of both the $C_4$ and $C_1$ bits of FIG. 3 can be screened on to disc 14 and the detectors $9C_4$ and $9C_1$ can both be associated therewith, the detector $9C_4$ being positioned 45° in advance of the detector $9C_1$. Thus the detectors $9C_4$ and $9C_1$ will both detect the information on track 48 but in the appropriate phase of relationship whereby to yield bits $C_4$ and $C_1$ in the same manner as shown in FIG. 3.

A track is also eliminated from the disc 12 and this is effected by utilizing a single track 62 to yield bits $A_1$ and $D_4$. A study of FIG. 3 will indicate that the $A_1$ bit is off for 20,000 feet and is on for 32,000 feet of the 52,000 foot of measured altitude. Bit $D_4$ is on for 20,000 feet and is off for 32,000 feet. Thus it will be seen that there is a reciprocal relationship between the $A_1$ and $D_4$ bits. Further, it will be seen that the changes of condition are out of phase. The reciprocal relationship between the $A_1$ and $D_4$ bits can be coped with by providing two detectors $9A_1$ and $9D_4$ and connecting one of them to the output of the encoder through an inverter 64 as previously mentioned. As shown herein the $D_4$ detector, that is detector $9D_4$, is connected to inverter 64. Thus when the $9D_4$ detector detects the presence of a mark 13 on a track 62 it will put out a signal and that signal will be inverted by inverter 64 to cause the output of the encoder to show that there is no mark. Conversely, when $9D_4$ detects the absence of a mark 13 on track 62, it will not put out a signal and this will cause inverter 64 to put out a signal as if a mark is in register. The phase shift is handled in precisely the same way as previously discussed with respect to the bits $C_1$ and $C_4$. Again, referring to FIG. 3, it will be seen that the $D_4$ bit goes on at about 30,700 feet, whereas the $A_1$ bit goes off (the reciprocal of going on) at 46,700 feet, 16,000 feet after $D_4$ goes on. Thus, the $D_4$ detector, that is detector $9D_4$, must be located 16,000 feet in advance of the $A_1$ detector. As disc 12 makes one revolution in 52,000 feet, detector $9D_4$ should be positioned along track 62 approximately 111° in advance of detector $9A_1$. This positioning of detector $9D_4$ in combination with the use of inverter 64 will cause an informational output that will be precisely that of bit $D_4$ of FIG. 3, whereas detector $9A_1$ will yield information precisely the same as bit $A_1$ of FIG. 3. Thus the single track 62 together with the two detectors $9A_1$ and $9D_4$ and the inverter 64 can yield the two bits of information.

In this manner, two tracks are omitted which either enables the discs 12 and 14 to be smaller or enables the tracks on the discs to be disposed further out near the periphery thereof which tends to improve the accuracy of the encoder.

What is claimed is

1. A shaft encoder comprising
   first and second rotatable shafts which are disposed out of axial alignment;
   first and second elements mounted respectively on said first and second shafts for rotation therewith;
   a plurality of optical detecting means associated with each of said first and second elements, said detecting means having first and second states, means for intermittently changing the states of said detecting means in accordance with the angular position of said first and second elements;
   means for rotating said second shaft;
   and means interposed between said means for rotating said second shaft and said first shaft for rotating said first shaft at a lower average angular speed than said second shaft, said rotating means for said first shaft including
   means for intermittently rotating said first shaft through an angle of such size that the state of at least one of said detecting means associated with said first element is changed, said first shaft and element remaining stationary between intermittent rotation, whereby to reduce the transition time of said detecting means.

2. The encoder of claim 1, wherein said intermittent rotating means is a geneva drive.

3. The encoder of claim 1, wherein said two elements are transparent discs, and said means for changing the state of said detectors is opaque indicia on said discs.

4. In an altitude encoder for encoding altitude in accordance with the 10 bit Altitude Telemetry Code, said encoder comprising first and second rotatable elements disposed out of axial alignment,
   said first element having information thereon in accordance with the five bits of said code having the shortest periodicity, means for rotating said first element once per 4000 feet,
   five detectors, one for each bit on said first element, for detecting the information on said first element,
   said second element having information thereon in accordance with the five bits of said code having the greatest periodicity,
   a second group of five detectors, one for each bit on said second element, for detecting the information on said second element, each of said detectors having two states,
   means for intermittently rotating said second element at an average speed of one revolution per full range of said encoder, said intermittent rotating means being effective for rotating said second element once per 2000 feet through an angle sufficient to cause the state of at least one of said second group of detectors to change, said second element being stationary between intervals of rotation.

5. The altitude encoder of claim 4, wherein said intermittent rotating means is arranged to rotate said second element through said angle in substantially less than 1000 feet.

* * * * *